(12) United States Patent
Iwami

(10) Patent No.: US 12,277,741 B2
(45) Date of Patent: Apr. 15, 2025

(54) POINT CLOUD DATA PROCESSING APPARATUS, POINT CLOUD DATA PROCESSING METHOD, AND PROGRAM

(71) Applicant: FUJIFILM Corporation, Tokyo (JP)

(72) Inventor: Kazuchika Iwami, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 190 days.

(21) Appl. No.: 17/496,078

(22) Filed: Oct. 7, 2021

(65) Prior Publication Data

US 2022/0027654 A1 Jan. 27, 2022

Related U.S. Application Data

(63) Continuation of application No. PCT/JP2020/019286, filed on May 14, 2020.

(30) Foreign Application Priority Data

Jun. 14, 2019 (JP) ................................. 2019-111185

(51) Int. Cl.
*G06V 10/22* (2022.01)
*G06F 18/21* (2023.01)
(Continued)

(52) U.S. Cl.
CPC .............. *G06V 10/22* (2022.01); *G06F 18/21* (2023.01); *G06T 7/30* (2017.01); *G06T 17/00* (2013.01);
(Continued)

(58) Field of Classification Search
None
See application file for complete search history.

(56) References Cited

U.S. PATENT DOCUMENTS

2006/0244746 A1\* 11/2006 England .................. G06T 11/60
345/419
2010/0207936 A1 8/2010 Minear et al.
(Continued)

FOREIGN PATENT DOCUMENTS

CN 102317973 A 1/2012
CN 108765535 A \* 11/2018 ........... G06T 15/005
(Continued)

OTHER PUBLICATIONS

Kim et al. "Digital Elevation Modeling via Curvature Interpolation for Lidar Data", EJDE-2016/CONF/23, p. 47-57 (Year: 2016).\*
(Continued)

*Primary Examiner* — Yingchun He
(74) *Attorney, Agent, or Firm* — Studebaker Brackett PLLC

(57) ABSTRACT

A point cloud data processing apparatus includes: an image data acquisition unit that acquires image data of an object; a point cloud data acquisition unit that acquires point cloud data; a recognition unit that recognizes the object on the basis of the image data, and acquires a region of the object and attribute information for identifying the object; and an attribute assigning unit that selects, from the point cloud data, point cloud data that belongs to the region of the object, and assigns the identified attribute information to the selected point cloud data.

14 Claims, 9 Drawing Sheets

(51) Int. Cl.
  *G06T 7/30* (2017.01)
  *G06T 17/00* (2006.01)
  *G06V 20/00* (2022.01)
  *G06V 20/64* (2022.01)
(52) U.S. Cl.
  CPC .............. *G06V 20/00* (2022.01); *G06V 20/64* (2022.01); *G06T 2207/10028* (2013.01); *G06T 2207/20081* (2013.01)

(56) References Cited

U.S. PATENT DOCUMENTS

| | | | |
|---|---|---|---|
| 2012/0293693 | A1 | 11/2012 | Sumitomo |
| 2016/0279791 | A1 | 9/2016 | Watanabe |
| 2017/0140539 | A1* | 5/2017 | Wang ..................... B25J 9/1697 |
| 2018/0282132 | A1* | 10/2018 | Laitasalmi .............. B66C 13/46 |
| 2019/0087976 | A1 | 3/2019 | Sugahara et al. |
| 2019/0096135 | A1 | 3/2019 | Dal Mutto et al. |
| 2019/0236380 | A1 | 8/2019 | Fukuhara et al. |
| 2019/0383941 | A1* | 12/2019 | Siddiqui .................. G01S 17/89 |
| 2019/0383944 | A1* | 12/2019 | Sasaki ..................... G01S 17/89 |
| 2021/0043002 | A1* | 2/2021 | Zeng .......................... G06T 7/74 |
| 2021/0256776 | A1* | 8/2021 | Cappello .................. G06T 7/90 |
| 2022/0139094 | A1* | 5/2022 | Yoshimi ................ G06V 10/26 382/173 |

FOREIGN PATENT DOCUMENTS

| | | |
|---|---|---|
| JP | 2004-348575 A | 12/2004 |
| JP | 2009-053059 A | 3/2009 |
| JP | 2013-097489 A | 5/2013 |
| JP | 2018-124973 A | 8/2018 |
| WO | 2018/066352 A1 | 4/2018 |

OTHER PUBLICATIONS

International Search Report issued in PCT/JP2020/019286; mailed Jul. 21, 2020.
International Preliminary Report on Patentability and Written Opinion issued in PCT/JP2020/019286; issued Dec. 14, 2021.
The extended European search report issued by the European Patent Office on Jul. 7, 2022, which corresponds to European Patent Application No. 20821721.6-1207 and is related to U.S. Appl. No. 17/496,078.
An Office Action; "Notice of Reasons for Refusal," mailed by the Japanese Patent Office on Jan. 27, 2023, which corresponds to Japanese Patent Application No. 2021-525955 and is related to U.S. Appl. No. 17/496,078; with English language translation.
Communication pursuant to Article 94(3) EPC issued by the European Patent Office on Mar. 28, 2024, which corresponds to European Patent Application No. 20821721.6-1207 and is related to U.S. Appl. No. 17/496,078.
Lahoud Jean et al., "2D-Driven 3D Object Detection in RGB-D Images", 2017 IEEE International Conference on Computer Vision (ICCV), IEEE, Oct. 22, 2017, pp. 4632-4640, doi: 10.1109/ICCV.2017.495.
Charles R. Qi et al., "Frustum PointNets for 3D Object Detection from RGB-D Data", Proceedings of the IEEE Conference on Computer Vision and Pattern Recognition(CVPR), IEEE, Apr. 13, 2018, pp. 918-927, doi: 10.1109/CVPR.2018.00102.
An Office Action mailed by the Chinese Patent Office on May 25, 2024, which corresponds to Chinese Patent Application No. 202080033302.2 and is related to U.S. Appl. No. 17/496,078.
An Office Action; mailed by the China National Intellectual Property Administration of the People's Republic of China on Nov. 6, 2024, which corresponds to Chinese Patent Application No. 202080033302.0 and is related to U.S. Appl. No. 17/496,078.

* cited by examiner

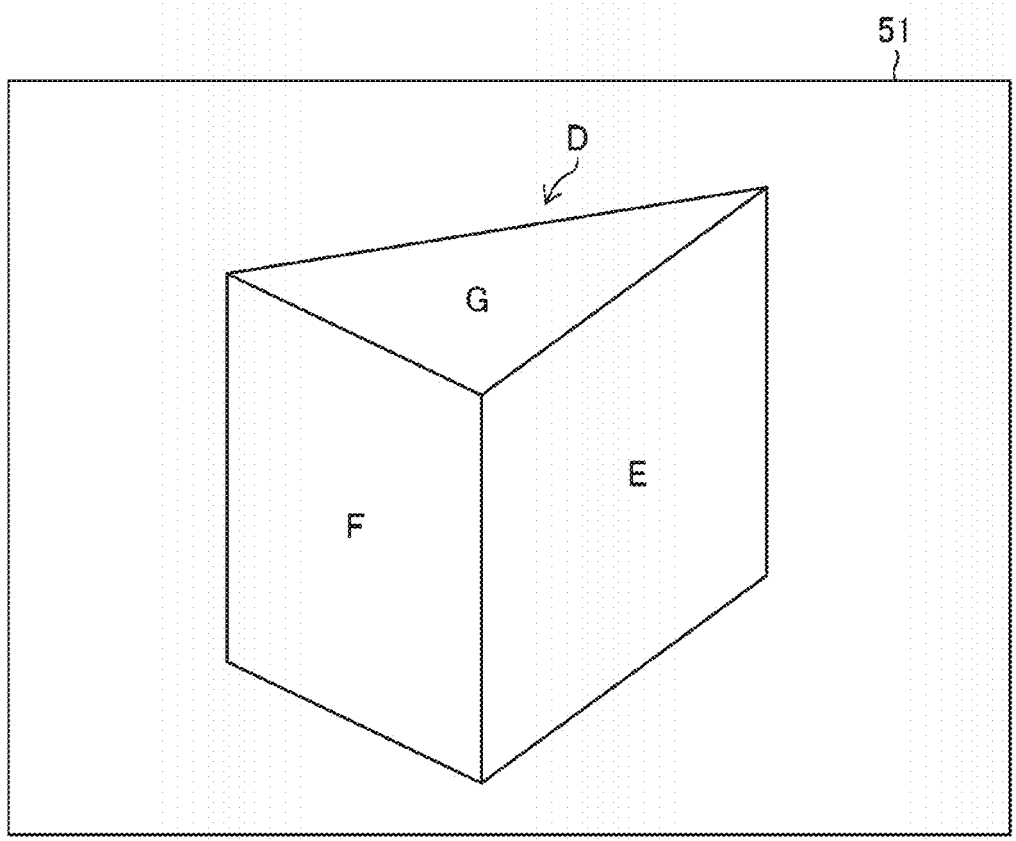

POINT CLOUD DATA PROCESSING APPARATUS, POINT CLOUD DATA PROCESSING METHOD, AND PROGRAM

CROSS-REFERENCE TO RELATED APPLICATIONS

This application is a Continuation of PCT International Application No. PCT/JP2020/019286 filed on May 14, 2020, which claims priority under 35 U.S.C § 119(a) to Japanese Patent Application No. 2019-111185 filed on Jun. 14, 2019. Each of the above application(s) is hereby expressly incorporated by reference, in its entirety, into the present application.

BACKGROUND OF THE INVENTION

1. Field of the Invention

The present invention relates to a point cloud data processing apparatus, a point cloud data processing method, and a program and specifically relates to a technique for classifying point cloud data and assigning attribute information.

2. Description of the Related Art

A technique using, for example, a laser scanner is known in which reflection on the surface of an object is used to acquire point cloud data constituted by a large number of points representing three-dimensional information of the surface of the object. The acquired point cloud data is used in various forms.

For example, when the points that constitute the acquired point cloud data are grouped on a per object basis, a three-dimensional model of the object can be generated from the point cloud data.

JP2013-97489A describes a technique in which point cloud data of an object is acquired, and a two-dimensional geometric shape of the object created in advance is used to perform grouping.

SUMMARY OF THE INVENTION

In JP2013-97489A, the two-dimensional geometric shape of the target object is used to group the point cloud; however, it is not always the case that the two-dimensional geometric shape of the target object is available to the user. For example, there may be a case where the two-dimensional geometric shape of the object is not present and a case where although the two-dimensional geometric shape of the object is present, the form of the object has been changed before point cloud data of the object is acquired and there is a difference between the two-dimensional geometric shape and the object.

The present invention has been made in view of the above-described circumstances, and an object thereof is to provide a point cloud data processing apparatus, a point cloud data processing method, and a non-transitory computer readable recording medium storing a program for enabling easy and efficient grouping of point cloud data without using a two-dimensional geometric shape of the target object.

To achieve the above-described object, a point cloud data processing apparatus according to an aspect of the present invention includes: an image data acquisition unit that acquires image data of an object; a point cloud data acquisition unit that acquires point cloud data having a corresponding positional relationship with the image data and representing pieces of three-dimensional information of a large number of points on an outer surface of the object; a recognition unit that recognizes the object on the basis of the image data, and acquires a region of the object and attribute information for identifying the object; and an attribute assigning unit that selects, from the point cloud data, point cloud data that belongs to the region of the object, and assigns the acquired attribute information to the selected point cloud data.

According to this aspect, the region of an object and attribute information for identifying the object are acquired on the basis of image data, and point cloud data that belongs to the region of the identified object is selected and assigned the attribute information. Accordingly, in this aspect, even in a case where a two-dimensional geometric shape of the object is not prepared in advance, it is possible to select the point cloud data easily and efficiently by using the acquired image data of the object and assign the attribute information.

Preferably, the recognition unit acquires, in a case where the image data includes pieces of image data of a plurality of objects, a region of each object among the objects and attribute information for identifying the object on a per object basis, and the attribute assigning unit selects, from the point cloud data, point cloud data that belongs to the region of each object among the objects on a per object basis, and assigns the attribute information of the object to the point cloud data selected on a per object basis.

Preferably, the recognition unit recognizes, in a case where the image data includes image data of the object having a plurality of partial regions, a region of each partial region among the partial regions, and acquires the region of the partial region and attribute information for identifying the partial region, and the attribute assigning unit selects, from the point cloud data, point cloud data that belongs to the region of each partial region among the partial regions on a per partial region basis, and assigns the attribute information of the partial region to the point cloud data selected on a per partial region basis.

Preferably, the point cloud data processing apparatus further includes a point cloud data complementing unit that detects a missing part of the point cloud data that belongs to the region of the object on the basis of at least the region of the object recognized by the recognition unit, and interpolates point cloud data of the detected missing part, in which the attribute assigning unit assigns the attribute information to the complemented point cloud data.

Preferably, the image data acquisition unit acquires a captured image acquired by image capturing of the object as the image data.

Preferably, the point cloud data processing apparatus further includes an image data generation unit that generates the image data on the basis of the point cloud data, in which the image data acquisition unit acquires the image data generated by the image data generation unit.

Preferably, the recognition unit is formed of a recognizer subjected to machine learning or deep learning.

Preferably, the point cloud data processing apparatus further includes a three-dimensional model generation unit that generates a three-dimensional model of the object on the basis of the point cloud data that is assigned the attribute information.

Preferably, the image data and the point cloud data are respectively acquired by devices having the same optical axis.

Preferably, the image data and the point cloud data are respectively acquired by devices for which a positional relationship between the devices is known.

To achieve the above-described object, a point cloud data processing method according to another aspect of the present invention includes: a step of acquiring image data of an object; a step of acquiring point cloud data having a corresponding positional relationship with the image data and representing pieces of three-dimensional information of a large number of points on an outer surface of the object; a step of recognizing the object on the basis of the image data, and acquiring a region of the object and attribute information for identifying the object; and a step of selecting, from the point cloud data, point cloud data that belongs to the region of the object, and assigning the acquired attribute information to the selected point cloud data.

To achieve the above-described object, a non-transitory computer readable recording medium storing a program according to yet another aspect of the present invention causes a computer to perform a point cloud data process including: a step of acquiring image data of an object; a step of acquiring point cloud data having a corresponding positional relationship with the image data and representing pieces of three-dimensional information of a large number of points on an outer surface of the object; a step of recognizing the object on the basis of the image data, and acquiring a region of the object and attribute information for identifying the object; and a step of selecting, from the point cloud data, point cloud data that belongs to the region of the object, and assigning the acquired attribute information to the selected point cloud data.

According to the present invention, the region of an object and attribute information for identifying the object are acquired on the basis of image data, and point cloud data that belongs to the region of the identified object is selected and assigned the attribute information. Therefore, even in a case where a two-dimensional geometric shape of the object is not prepared in advance, it is possible to classify the point cloud data easily and efficiently by using the acquired image data of the object and assign the attribute information.

BRIEF DESCRIPTION OF THE DRAWINGS

FIG. 11 is a diagram illustrating a captured image that includes a triangular prism object as a photographic subject.

DESCRIPTION OF THE PREFERRED EMBODIMENTS

Hereinafter, preferred embodiments of a point cloud data processing apparatus, a point cloud data processing method, and a program according to the present invention will be described with reference to the attached drawings.

Figure 1:
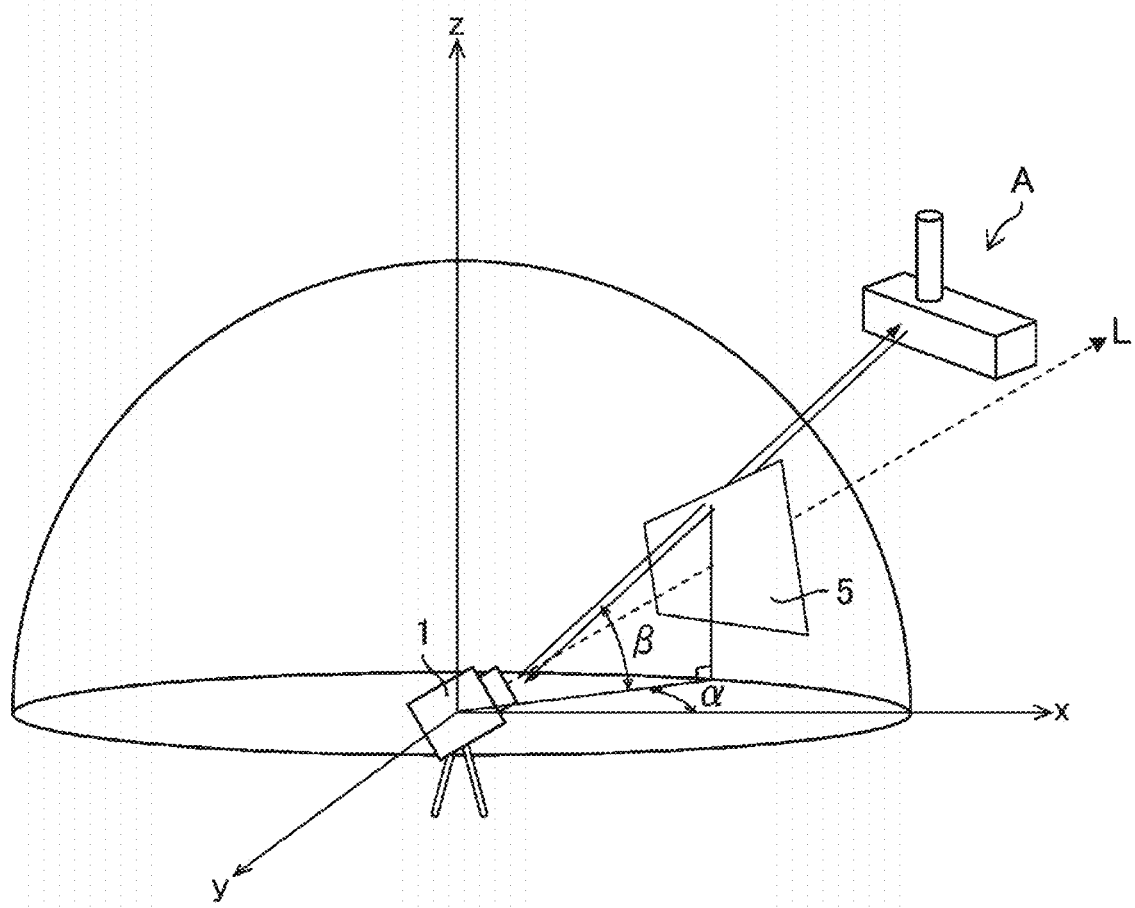
FIG. 1 is a schematic diagram illustrating a form in which image data and point cloud data are acquired.
Figure 2:
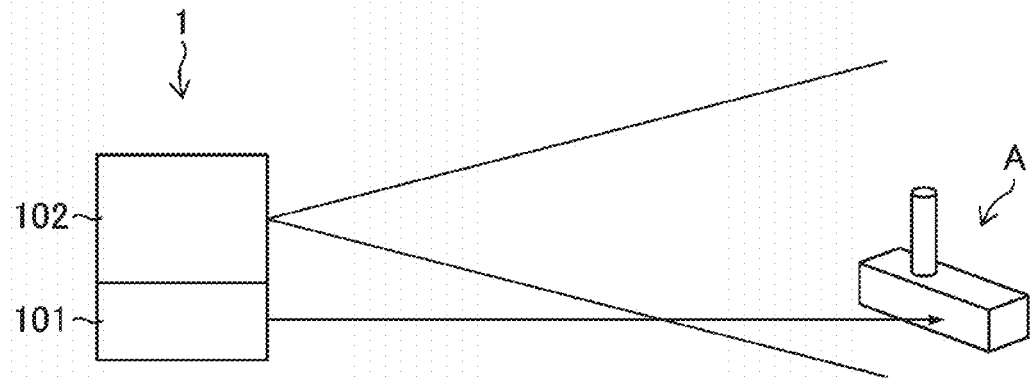
FIG. 2 is a schematic diagram for explaining a laser scanner and an image capturing device mounted in a three-dimensional measuring device.

FIG. 1 is a schematic diagram illustrating a form in which image data (a captured image 5) and point cloud data 7 (see FIG. 4) that are input to a point cloud data processing apparatus 11 (see FIG. 4) are acquired by a three-dimensional measuring device 1. FIG. 2 is a schematic diagram for explaining a laser scanner 101 and an image capturing device (camera) 102 mounted in the three-dimensional measuring device 1.

As illustrated in FIG. 1, the three-dimensional measuring device 1 acquires point cloud data of an object A that is a measurement target and the captured image 5 that includes the object A as a photographic subject.

The three-dimensional measuring device 1 is of a time-of-flight type in which a laser pulse is emitted from the laser scanner 101 (see FIG. 2) mounted therein and the time taken by the laser pulse to return after reflected on the surface of the object A that is a measurement target is used to measure the distance. The laser scanner 101 acquires angle information of the emission direction of the laser pulse (FIG. 1 illustrates a horizontal direction $\alpha$ and a vertical direction $\beta$) with reference to the center of rotation of the laser scanner 101. The laser scanner 101 acquires three-dimensional information of the reflection point of the laser pulse on the basis of the measured distance and the angle information of the emission direction of the laser pulse. The laser scanner 101 acquires pieces of three-dimensional information of a large number of points while changing the horizontal direction $\alpha$ and the vertical direction $\beta$ that define the emission direction of the laser pulse by a specific pitch. Here, point cloud data is data that represents pieces of three-dimensional information of a large number of points on the outer surface of the measurement target object, and each of the points constituting the point cloud data has a piece of three-dimensional information (three-dimensional coordinates). The laser scanner 101 need not be of a time-of-flight type and may be one that acquires point cloud data by using a phase difference method or a trigonometry method.

The three-dimensional measuring device 1 acquires the captured image 5 by using the image capturing device 102 (see FIG. 2) mounted therein and having an optical axis L. The image capturing device 102 includes an imaging element, such as a CCD (charge-coupled device) image sensor, not illustrated. The imaging element has a plurality of pixels that are photoelectric elements arranged in two dimensions, namely, in an x direction (horizontal direction) and a y direction (vertical direction), and includes, for example, a color filter (not illustrated), in which R (red), G (green), and B (blue) filters are arranged in two dimensions in the Bayer arrangement, on the top surface of the plurality of pixels. The image capturing device 102 is used to acquire the captured image 5 that is a color image. Note that the captured image acquired by the image capturing device 102 need not be a color image and may be a monochrome image.

In the three-dimensional measuring device 1, the image capturing device 102 is placed on top of the laser scanner 101, and the positional relationship between the laser scanner 101 and the image capturing device 102 is known. Note that the positional relationship between the laser scanner 101 and the image capturing device 102 is not be limited to a specific relationship as long as the positional relationship is known. For example, the laser scanner 101 and the image capturing device 102 may be placed so as to have the same optical axis. The three-dimensional measuring device 1 can acquire the point cloud data and the captured image 5 simultaneously or serially.

Although the three-dimensional measuring device 1 acquires the point cloud data by the laser scanner 101, means for acquiring the point cloud data is not limited to the laser scanner 101. For example, the point cloud data may be acquired by using a ToF (time-of-flight) camera or a stereo camera.

Figure 3:
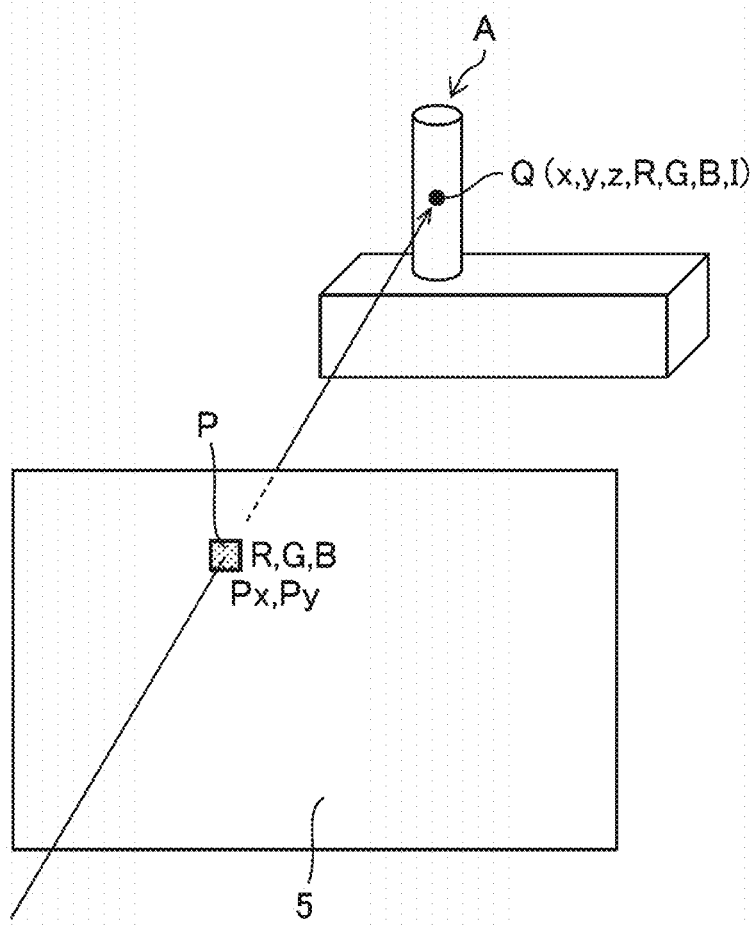
FIG. 3 is a schematic diagram for explaining that a captured image and point cloud data have a corresponding positional relationship.

FIG. 3 is a schematic diagram for explaining that the captured image 5 and the point cloud data 7 (see FIG. 4) have a corresponding positional relationship. The captured image 5 is image data in which pixels P are arranged in two dimensions. Each pixel P has values of R, G, and B respectively. FIG. 3 illustrates a pixel P having coordinates (Px, Py) in the captured image 5 and a point Q having a corresponding positional relationship with the pixel P. The point Q constitutes the point cloud data 7 and has information including three-dimensional coordinates (x, y, z), which indicate positional information, and the R, G, and B values and the reflection intensity (I) of the corresponding pixel P. The correspondence relationship between the pixel P and the point Q can be acquired because the captured image 5 and the point cloud data 7 have a corresponding positional relationship.

A description is given below of the point cloud data processing apparatus 11 to which the captured image 5 and the point cloud data 7 thus acquired are input.

First Embodiment

Figure 4:
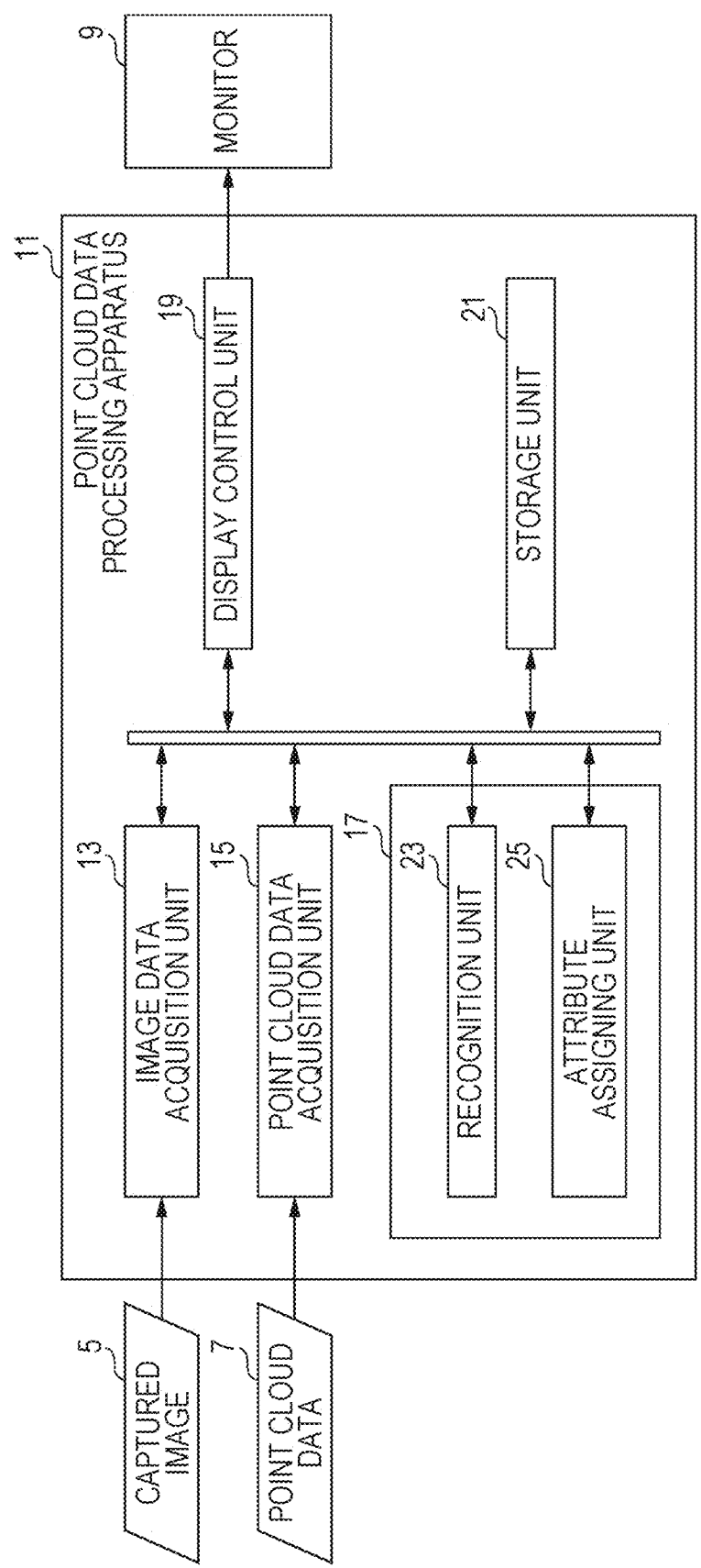
FIG. 4 is a block diagram illustrating an example functional configuration of a point cloud data processing apparatus.

FIG. 4 is a block diagram illustrating an example functional configuration of the point cloud data processing apparatus 11 of a first embodiment. The point cloud data processing apparatus 11 is formed of, for example, a computer. The point cloud data processing apparatus 11 may be mounted in the three-dimensional measuring device 1 or may be formed of a computer separate from the three-dimensional measuring device 1.

The point cloud data processing apparatus 11 includes an image data acquisition unit 13, a point cloud data acquisition unit 15, a control unit 17, a display control unit 19, and a storage unit 21.

The image data acquisition unit 13 acquires the captured image 5 acquired by image capturing of the object A as image data. The image data acquisition unit 13 acquires the captured image 5 by wire or wirelessly.

The point cloud data acquisition unit 15 acquires the point cloud data 7. The point cloud data acquisition unit 15 acquires the point cloud data 7 by wire or wirelessly.

The captured image (image data) 5 acquired by the image data acquisition unit 13 and the point cloud data 7 acquired by the point cloud data acquisition unit 15 have a corresponding positional relationship.

The control unit 17 is formed of a CPU (central processing unit) (not illustrated) that is mounted in the computer. The control unit 17 includes a recognition unit 23 and an attribute assigning unit 25.

The recognition unit 23 recognize an object on the basis of the captured image 5 and acquires the region of the object and attribute information for identifying the object. The recognition unit 23 can acquire the region of the object in the captured image and attribute information for identifying the object by using various methods. For example, the recognition unit 23 is formed of a recognizer that is subjected to machine learning or deep learning, and performs segmentation for the captured image to thereby acquire the region of the object and attribute information for identifying the object. Note that in the segmentation, an existing model, such as FCN (Fully Convolutional Network), SegNet, or Pix2Pix, may be used or a model that corresponds to the form of recognition of the object A by the recognition unit 23 may be separately created. As learning for the recognition unit 23, deep learning may be used or machine learning in a broad sense may be used.

Figure 5A:
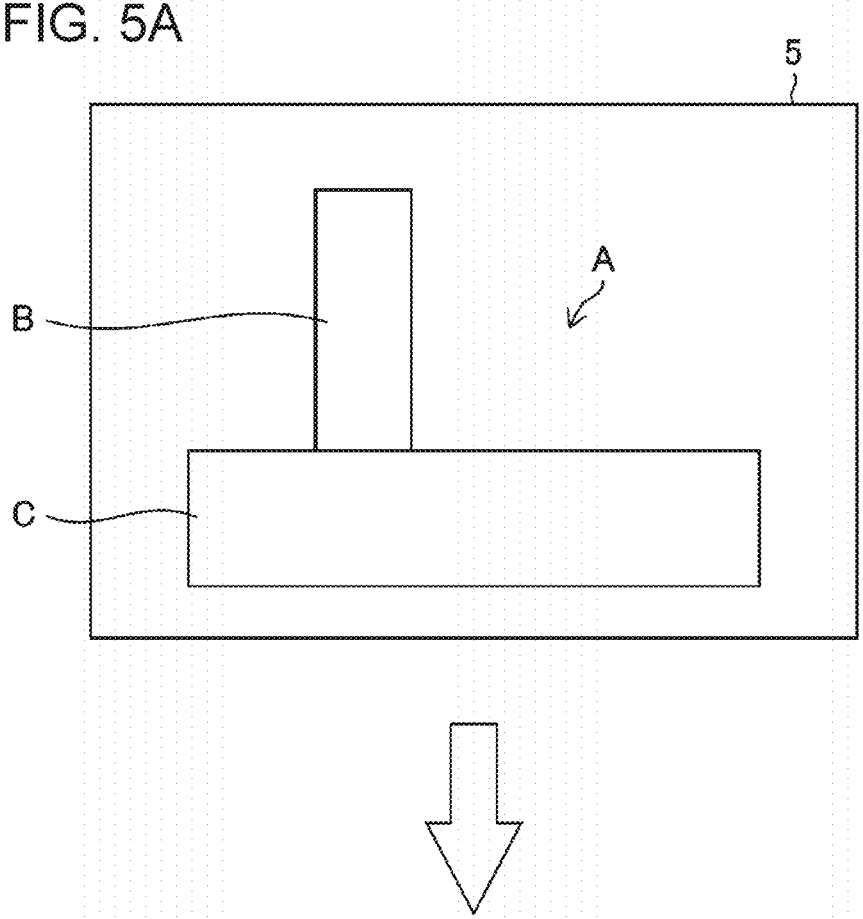
FIGS. 5A and 5B are diagrams for explaining recognition of an object A by a recognition unit performing segmentation.
Figure 5B:
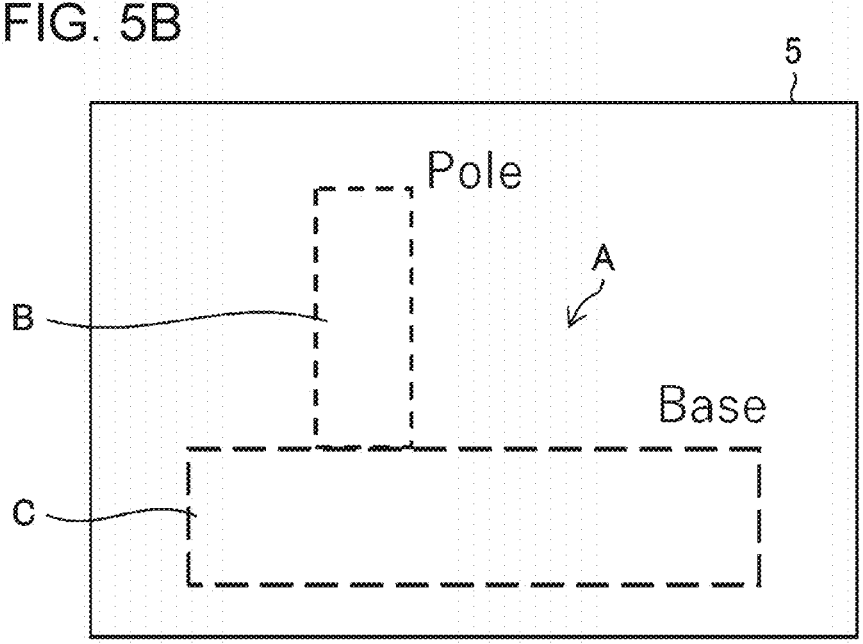

FIGS. 5A and 5B are diagrams for explaining recognition of the object A by the recognition unit 23 performing segmentation. Here, the object A is constituted by an object B and an object C, and the recognition unit 23 to which the captured image 5 is input acquires the region of the object B and attribute information of the object B, and the region of the object C and attribute information of the object C.

The recognition unit 23 is a recognizer subjected to machine learning. The recognition unit 23 performs segmentation for the captured image 5 illustrated in FIG. 5A to thereby identify the region of the object B (shown by a dotted line in FIG. 5B), acquire attribute information (Pole) of the region, identify the region of the object C (shown by a dotted line in FIG. 5B), and acquire attribute information (Base) of the region, as illustrated in FIG. 5B. Although recognition of the object B and the object C from the captured image 5 has been described with reference to FIGS. 5A and 5B, the recognition unit 23 need not perform such recognition and may, for example, acquire the region of the object A and attribute information of the object A from the captured image 5.

Referring back to FIG. 4, the attribute assigning unit 25 selects point cloud data that belongs to the region of the object B from the point cloud data 7 and assigns the attribute information (Pole) to the selected point cloud data. Specifically, the attribute assigning unit 25 first selects point cloud data constituted by points Q that correspond to pixels P in the region of the object B in the captured image 5. Each of the pixels P of the captured image 5 corresponds to a corresponding one of the points Q that constitute the point cloud data. Therefore, in a case where the region of the object B in the captured image 5 is identified, point cloud data 7 that corresponds to the object B in the point cloud data can be selected. Thereafter, the attribute assigning unit 25 assigns the attribute information (Pole) or the attribute information (Base) to the selected point cloud data. Attribute information of the object B and that of the object C are not limited to attributes related to the form of the object B and that of the object C. As attribute information, for example, "b" and "c" acquired by naming (labeling) the object B and the object C for simply distinguishing the object B and the object C from each other may be used.

Figure 6:
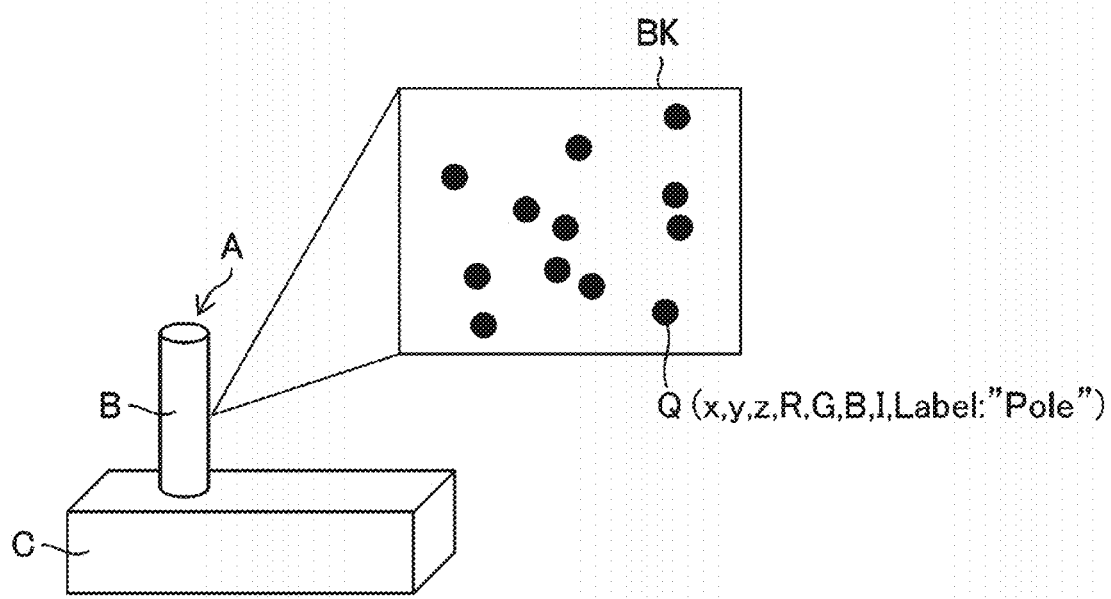
FIG. 6 is a diagram for explaining a point Q that is assigned attribute information.

FIG. 6 is a diagram for explaining the points Q that are assigned the attribute information (Pole). Point cloud data of the object B is shown by an enlarged diagram BK, and each point Q that constitutes the point cloud data is assigned its three-dimensional coordinates (x, y, z), the R, G, and B values and the reflection intensity I of a corresponding pixel P, and attribute information "Label: "Pole"" recognized from the captured image 5. In a case where attribute information is thus assigned to each point Q, the point cloud data can be grouped on a per attribute basis. Although a description is omitted, the attribute information (Base) is similarly assigned to each point that corresponds to the object C.

Referring back to FIG. 4, the storage unit 21 stores the image data and the point cloud data 7. The storage unit 21 also stores various programs that are executed by the CPU in order to attain various functions of the point cloud data processing apparatus 11.

The display control unit 19 is formed of the CPU and controls display on a monitor 9. On the monitor 9, for example, point cloud data and/or image data is displayed.

Note that the point cloud data processing apparatus 11 may have an instruction accepting unit (not illustrated) formed of a keyboard or a mouse for accepting an instruction from a user.

Figure 7:
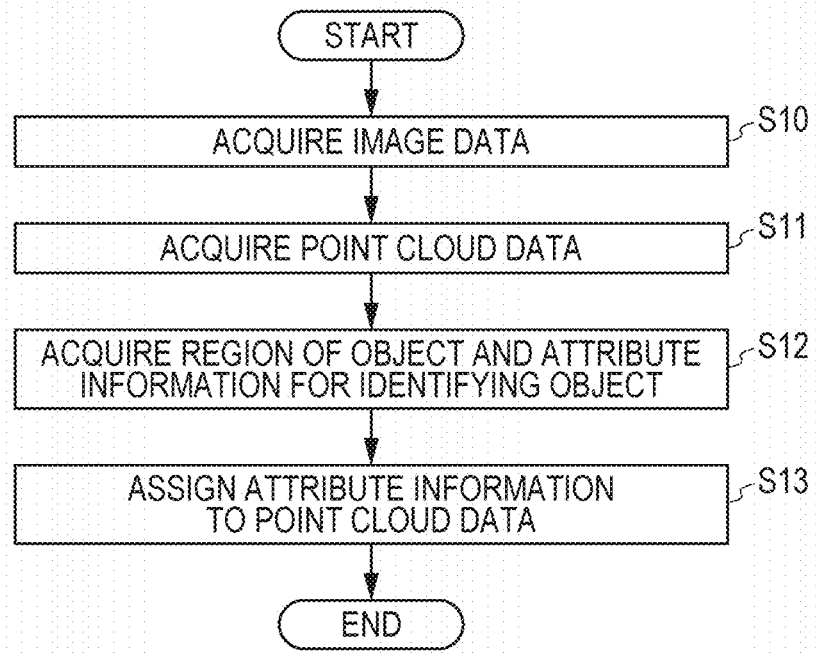
FIG. 7 is a flowchart for explaining a point cloud data processing method using the point cloud data processing apparatus.

FIG. 7 is a flowchart for explaining a point cloud data processing method using the point cloud data processing apparatus 11.

First, the image data acquisition unit 13 of the point cloud data processing apparatus 11 acquires the captured image 5 as image data (step S10). Subsequently, the point cloud data acquisition unit 15 acquires the point cloud data 7 (step S11). Next, the recognition unit 23 of the point cloud data processing apparatus 11 recognizes an object on the basis of the image data and acquires the region of the object and attribute information for identifying the object (step S12). Subsequently, the attribute assigning unit 25 of the point cloud data processing apparatus 11 selects point cloud data that belongs to the region of the object in the captured image 5 and assigns the attribute information to the selected point cloud data (step S13).

As described above, according to this embodiment, the region of an object and attribute information for identifying the object are acquired on the basis of a captured image (image data), and point cloud data is selected and assigned the attribute information on the basis of the region of the identified object and the attribute information of the object. Accordingly, in this form, even in a case where a two-dimensional geometric shape of the object is not prepared in advance, it is possible to select the point cloud data easily and efficiently by using the acquired captured image of the object and assign the attribute information.

In the embodiment described above, the hardware configuration of the processing units that perform various types of processing is implemented as various processors as described below. The various processors include a CPU, which is a general-purpose processor executing software (program) to function as various processing units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing.

One processing unit may be configured as one of the various processors or two or more processors of the same type or different types (for example, a plurality of FPGAs or a combination of a CPU and an FPGA). Further, a plurality of processing units may be configured as one processor. As the first example of configuring a plurality of processing units as one processor, a form is possible where one or more CPUs and software are combined to configure one processor, and the processor functions as the plurality of processing units, a representative example of which is a computer, such as a client or a server. As the second example thereof, a form is possible where a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above.

Further, the hardware configuration of the various processors is more specifically an electric circuit (circuitry) in which circuit elements, such as semiconductor elements, are combined.

The configurations and functions described above can be implemented as any hardware, software, or a combination thereof as appropriate. For example, the present invention is applicable to a program for causing a computer to perform the above-described processing steps (processing procedure), a computer-readable recording medium (non-transitory recording medium) to which the program is recorded, or a computer in which the program can be installed.

Second Embodiment

Now, a second embodiment is described. In this embodiment, in a case where point cloud data includes a missing part, the missing part is interpolated. On the basis of the complemented point cloud data, a three-dimensional model is generated.

Figure 8:
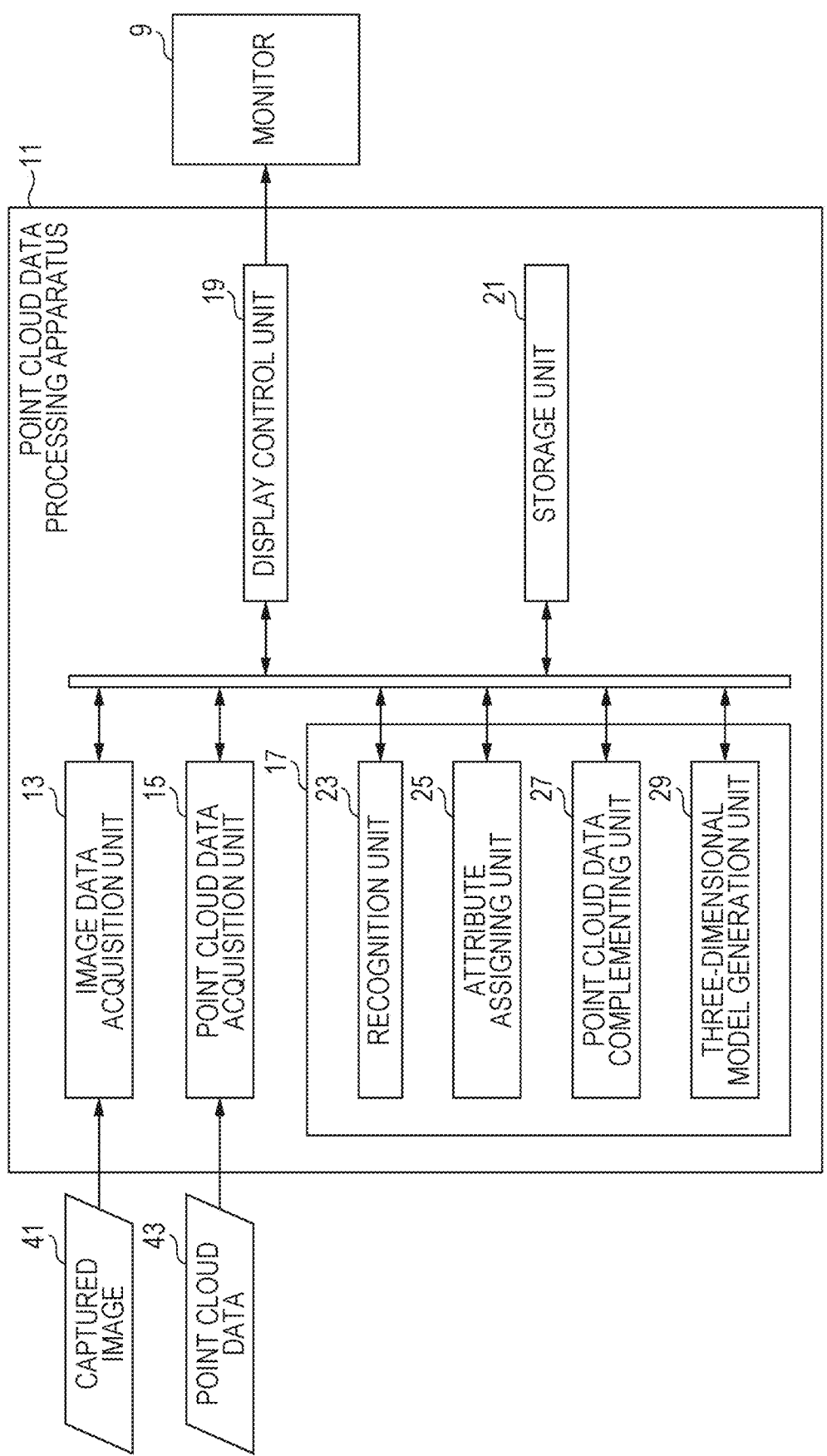
FIG. 8 is a block diagram illustrating an example functional configuration of the point cloud data processing apparatus.

FIG. 8 is a block diagram illustrating an example functional configuration of the point cloud data processing apparatus 11 of this embodiment. A part that has already been described with reference to FIG. 4 is assigned the same reference numeral, and a description thereof is omitted.

The point cloud data processing apparatus 11 includes the image data acquisition unit 13, the point cloud data acquisition unit 15, the control unit 17, the display control unit 19, and the storage unit 21.

The control unit 17 includes the recognition unit 23, the attribute assigning unit 25, a point cloud data complementing unit 27, and a three-dimensional model generation unit 29.

The point cloud data complementing unit 27 complements point cloud data 43 acquired by the point cloud data acquisition unit 15 and having a corresponding positional relationship with a captured image (image data) 41. That is, in a case where the point cloud data 43 acquired by the point cloud data acquisition unit 15 includes a missing part, the point cloud data complementing unit 27 interpolates the missing part. Specifically, the point cloud data complementing unit 27 detects, on the basis of at least the region of an object recognized by the recognition unit 23, a missing part of the point cloud data 43 that belongs to the region of the object and interpolates the point cloud data of the detected missing part. Note that the point cloud data complementing unit 27 may use attribute information of an object D identified by the recognition unit 23 to complement the point cloud data 43. The point cloud data complementing unit 27 uses a publicly known technique to interpolate point cloud data of the missing part in the point cloud data 43.

The three-dimensional model generation unit 29 generates a three-dimensional model of the object on the basis of the point cloud data 43 that is assigned attribute information. The three-dimensional model generation unit 29 can generate a three-dimensional model on the basis of the point cloud data 43 acquired by the point cloud data acquisition unit 15 or the point cloud data 43 complemented by the point cloud data complementing unit 27. To generate a three-dimensional model on the basis of the point cloud data 43, information (attribute information) indicating that each point in the point cloud data 43 corresponds to a point on the surface of which object is useful information for creating a correct polygon mesh or for performing correct texture mapping. In generation of a three-dimensional model by the three-dimensional model generation unit 29, a publicly known technique is used.

Figure 9A:
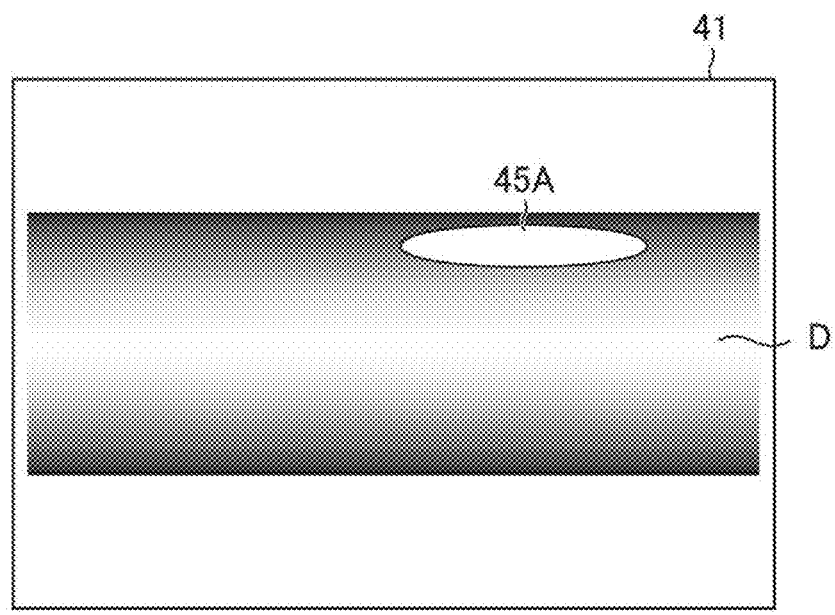
FIGS. 9A and 9B are diagrams for explaining complementing of point cloud data.
Figure 9B:
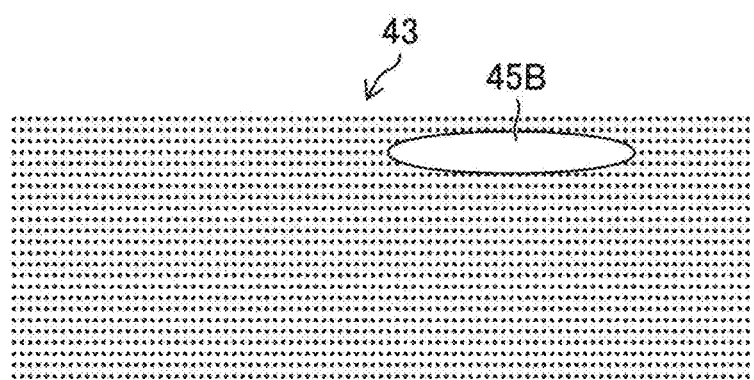

FIGS. 9A and 9B are diagrams for explaining complementing of the point cloud data 43 by the point cloud data complementing unit 27. FIG. 9A illustrates the captured image 41 acquired by the image data acquisition unit 13, and FIG. 9B illustrates the point cloud data 43 acquired by the point cloud data acquisition unit 15. In the captured image 41, the object D, which is a pipe, is present as a photographic subject.

As illustrated in FIG. 9A, the object D has a shiny part 45A that is a part in which light is regularly reflected and that has high luminance. In a portion corresponding to the shiny part 45A of the object D, a laser pulse emitted in order to acquire point cloud data is regularly reflected, and reception of the return light of the laser pulse fails. The laser scanner 101 fails to acquire point cloud data for the portion corresponding to the shiny part 45A. Therefore, as illustrated in FIG. 9B, a missing part 45B appears in the point cloud data 43 of the object D.

Even for the captured image 41 of the object D having the shiny part 45A, the recognition unit 23 can recognize the shiny part 45A as a part of the object D. The point cloud data complementing unit 27 recognizes the missing part 45B of the point cloud data 43 of the object D on the basis of the region of the object D or on the basis of the region of the object D and attribute information of the object D acquired by the recognition unit 23 and calculates point cloud data of the missing part 45B by linear interpolation using point cloud data in the neighborhood or by spline interpolation. In a case of an object, such as a pipe, having an outer surface in a cylindrical form, the point cloud data complementing unit 27 can interpolate point cloud data in the missing part 45B on the basis of the curvature of point cloud data in the neighborhood and the base vector of the cylinder. Accordingly, the point cloud data complementing unit 27 can interpolate the missing part 45B more accurately.

As described above, the point cloud data complementing unit 27 interpolates a missing part of point cloud data on the basis of the region of the object or on the basis of the region of the object and attribute information of the object, which enables more accurate complementing. In a case of generating a three-dimensional model by using complemented point cloud data, the three-dimensional model generation unit 29 can generate a more accurate three-dimensional model.

Third Embodiment

Now, a third embodiment is described. In the first embodiment and the second embodiment described above, a form in which the captured image 5 (or the captured image 41) is used as image data has been described. In this embodiment, image data other than a captured image is acquired.

Figure 10:
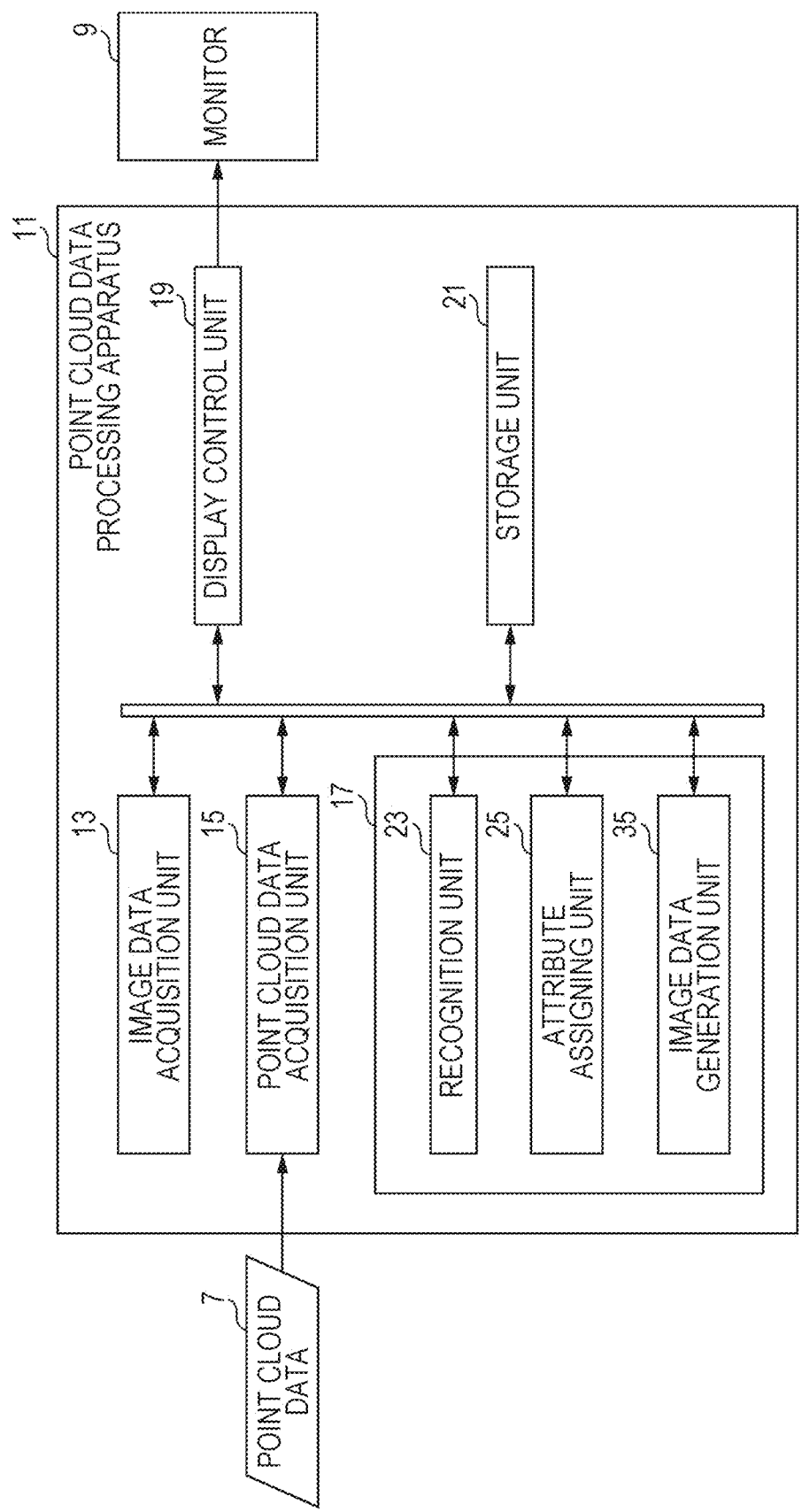
FIG. 10 is a block diagram illustrating an example functional configuration of the point cloud data processing apparatus.

FIG. 10 is a block diagram illustrating an example functional configuration of the point cloud data processing apparatus 11 of this embodiment. A part that has already been described with reference to FIG. 4 is assigned the same reference numeral, and a description thereof is omitted.

The point cloud data processing apparatus 11 includes the image data acquisition unit 13, the point cloud data acquisition unit 15, the control unit 17, the display control unit 19, and the storage unit 21. A part that has already been described with reference to FIG. 4 is assigned the same reference numeral, and a description thereof is omitted.

The control unit 17 includes the recognition unit 23, the attribute assigning unit 25, and an image data generation unit 35.

The image data generation unit 35 generates image data on the basis of the point cloud data 7. Points that constitute the point cloud data 7 each have three-dimensional coordinates, and therefore, the image data generation unit 35 can generate image data by projecting the three-dimensional coordinates of each point onto a specific plane. In this case, the image data generation unit 35 can form image data acquired by assigning pixel values (densities) in accordance with the reflection intensity or distance of each point. The image data acquisition unit 13 acquires the image data generated by the image data generation unit 35.

Accordingly, in a case where image data is generated from the point cloud data 7, even in a case where a captured image is not acquired, it is possible to acquire image data having a corresponding positional relationship with the point cloud data 7, classify the point cloud data easily and efficiently, and assign attribute information.

Fourth Embodiment

Now, a fourth embodiment is described. In this embodiment, point cloud data is grouped for each partial region of the object.

In a case where image data includes image data of an object having a plurality of partial regions, the recognition unit 23 of this embodiment recognizes the region of each partial region and acquires the region of each partial region and attribute information of each partial region for identifying the partial region.

The attribute assigning unit 25 classifies, of point cloud data, point cloud data that belongs to the region of each partial region on a per partial region basis and assigns attribute information of each partial region to the point cloud data classified on a per partial region basis.

FIG. 11 is a diagram illustrating a captured image 51 that includes the object D, which is a triangular prism, as a photographic subject. The recognition unit 23 identifies the region of a surface E of the object D (partial region), the region of a surface F thereof (partial region), and the region of a surface G thereof (partial region) from the captured image 51. The recognition unit 23 acquires pieces of attribute information of the respective partial regions for identifying the surface E, the surface F, and the surface G of the object D from the captured image 51. Note that the recognition unit 23 may identify the regions of the surface E, the surface F, and the surface G of the object D and acquire pieces of attribute information of the respective partial regions (the surface E, the surface F, and the surface G) by, for example, forming the recognition unit 23 as a recognizer that is subjected to machine learning or deep learning for extracting surfaces (including a flat surface and a curved surface) of an object. The recognition unit 23 may identify the regions of the surface E, the surface F, and the surface G of the object D and acquire pieces of attribute information of the respective partial regions by image processing for extracting the contours of the object.

As described above, in a case where point cloud data is grouped for each partial region of the object, it is possible to perform grouping that corresponds to the object more accurately.

Although examples of the present invention have been described above, the present invention should not be limited to the above-described embodiments, and various modifications can be made without departing from the spirit of the present invention as a matter of course.

REFERENCE SIGNS LIST 1 three-dimensional measuring device
5 captured image
7 point cloud data
9 monitor
11 point cloud data processing apparatus
13 image data acquisition unit
15 point cloud data acquisition unit
17 control unit
19 display control unit
21 storage unit
23 recognition unit
25 attribute assigning unit
27 point cloud data complementing unit
29 three-dimensional model generation unit
35 image data generation unit

What is claimed is:

1. A point cloud data processing apparatus comprising:
a processor that is configured to
   acquire image data of an object,
   acquire point cloud data having a corresponding positional relationship with the image data and representing pieces of three-dimensional information of a large number of points on an outer surface of the object,
   recognize the object on the basis of the image data, and acquire a region of the object and attribute information for identifying the object,
   select, from the point cloud data, point cloud data that belongs to the region of the object, and assign the acquired attribute information to the selected point cloud data,
   recognize a missing part of the point cloud data that belongs to the region of the object on the basis of the region of the object and the attribute information,
   calculate point cloud data of the missing part by linear interpolation using point cloud data in a neighborhood or by spline interpolation, and
   determine whether the missing part exists or not in the point cloud data on the basis of luminance of the image data,
wherein the processor is further configured to
   project three-dimensional coordinates of each point onto a specific plane to generate the image data having pixel values in accordance with reflection intensity or distance of each point of the point cloud data, and
   assign the attribute information based on the generated image data,
wherein the processor is configured to
   group the point cloud data for each partial region of the object by
      recognizing, in a case where the image data includes image data of the object having a plurality of partial regions, a region of each partial region among the plurality of partial regions, and acquiring the region of the each partial region and attribute information for identifying the each partial region, and
      selecting, from the point cloud data, point cloud data that belongs to the region of each partial region among the partial regions on a per partial region basis, and assigning the attribute information of the partial region to the point cloud data selected on a per partial region basis, and
wherein the processor is configured to identify each partial region of the object by image processing for extracting contours of the object to acquire the attribute information of each partial region.

2. The point cloud data processing apparatus according to claim 1, wherein the processor is configured to
   acquire, in a case where the image data includes pieces of image data of a plurality of objects, a region of each object among the objects and attribute information for identifying the object on a per object basis, and
   select, from the point cloud data, point cloud data that belongs to the region of each object among the objects on a per object basis, and assign the attribute information of the object to the point cloud data selected on a per object basis.

3. The point cloud data processing apparatus according to claim 1, wherein the processor is configured to
   assign the attribute information to the point cloud data of the missing part.

4. The point cloud data processing apparatus according to claim 1, wherein the processor is configured to acquire a captured image acquired by image capturing of the object as the image data.

5. The point cloud data processing apparatus according to claim 1, wherein the processor is configured to
   generate the image data on the basis of the point cloud data, and
   acquire the generated image data.

6. The point cloud data processing apparatus according to claim 1, wherein the processor is formed of a recognizer subjected to machine learning or deep learning.

7. The point cloud data processing apparatus according to claim 1, wherein the processor is configured to generate a three-dimensional model of the object on the basis of the point cloud data that is assigned the attribute information.

8. The point cloud data processing apparatus according to claim 1, wherein the image data and the point cloud data are respectively acquired by devices having a common optical axis.

9. The point cloud data processing apparatus according to claim 1, wherein the image data and the point cloud data are respectively acquired by devices for which a positional relationship between the devices is known.

10. The point cloud data processing apparatus according to claim 1, wherein the processor is configured to acquire data obtained by a laser scanner.

11. The point cloud data processing apparatus according to claim 1, wherein the processor is configured to acquire the point cloud data by using a Time-of-Flight (ToF) camera or a stereo camera.

12. The point cloud data processing apparatus according to claim 1, wherein the processor is configured to identify each partial region of the object by a recognizer constructed through machine learning or deep learning to acquire the attribute information of each partial region.

13. A point cloud data processing method comprising:
acquiring image data of an object;
acquiring point cloud data having a corresponding positional relationship with the image data and representing pieces of three-dimensional information of a large number of points on an outer surface of the object;

recognizing the object on the basis of the image data, and acquiring a region of the object and attribute information for identifying the object;

selecting, from the point cloud data, point cloud data that belongs to the region of the object, and assigning the acquired attribute information to the selected point cloud data;

recognizing a missing part of the point cloud data that belongs to the region of the object on the basis of the region of the object and the attribute information for identifying the object;

calculating point cloud data of the missing part by linear interpolation using point cloud data in a neighborhood or by spline interpolation; and determining whether the missing part exists or not in the point cloud data on the basis of luminance of the image data, wherein the method further comprises:
projecting three-dimensional coordinates of each point onto a specific plane to generate the image data having pixel values in accordance with reflection intensity or distance of each point of the point cloud data, and assigning the attribute information based on the generated image data, wherein the method further comprises:
grouping the point cloud data for each partial region of the object by
recognizing, in a case where the image data includes image data of the object having a plurality of partial regions, a region of each partial region among the plurality of partial regions, and acquiring the region of the each partial region and attribute information for identifying the each partial region, and selecting, from the point cloud data, point cloud data that belongs to the region of each partial region among the partial regions on a per partial region basis, and assigning the attribute information of the partial region to the point cloud data selected on a per partial region basis, and wherein the method further comprises identifying each partial region of the object by image processing for extracting contours of the object to acquire the attribute information of each partial region.

14. A non-transitory computer readable recording medium storing a program for causing a computer to perform a point cloud data process comprising:

acquiring image data of an object;

acquiring point cloud data having a corresponding positional relationship with the image data and representing pieces of three-dimensional information of a large number of points on an outer surface of the object;

recognizing the object on the basis of the image data, and acquiring a region of the object and attribute information for identifying the object;

selecting, from the point cloud data, point cloud data that belongs to the region of the object, and assigning the acquired attribute information to the selected point cloud data;

recognizing a missing part of the point cloud data that belongs to the region of the object on the basis of the region of the object and the attribute information for identifying the object;

calculating point cloud data of the missing part by linear interpolation using point cloud data in a neighborhood or by spline interpolation; and determining whether the missing part exists or not in the point cloud data on the basis of luminance of the image data, wherein the point cloud data process further comprises:
projecting three-dimensional coordinates of each point onto a specific plane to generate the image data having pixel values in accordance with reflection intensity or distance of each point of the point cloud data, and assigning the attribute information based on the generated image data, wherein the point cloud data process further comprises:
grouping the point cloud data for each partial region of the object by
recognizing, in a case where the image data includes image data of the object having a plurality of partial regions, a region of each partial region among the plurality of partial regions, and acquiring the region of the each partial region and attribute information for identifying the each partial region, and selecting, from the point cloud data, point cloud data that belongs to the region of each partial region among the partial regions on a per partial region basis, and assigning the attribute information of the partial region to the point cloud data selected on a per partial region basis, and wherein the point cloud data process further comprises identifying each partial region of the object by image processing for extracting contours of the object to acquire the attribute information of each partial region.

* * * * *